United States Patent
Han et al.

(10) Patent No.: US 9,952,668 B2
(45) Date of Patent: *Apr. 24, 2018

(54) METHOD AND APPARATUS FOR PROCESSING VIRTUAL WORLD

(71) Applicant: SAMSUNG ELECTRONICS CO., LTD., Suwon-si (KR)

(72) Inventors: Jae Joon Han, Seoul (KR); Seung Ju Han, Seoul (KR); Won Chul Bang, Seongnam-si (KR); Do Kyoon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,896

(22) Filed: Feb. 23, 2015

(65) Prior Publication Data

US 2015/0169065 A1 Jun. 18, 2015

Related U.S. Application Data

(63) Continuation of application No. 13/082,698, filed on Apr. 8, 2011, now Pat. No. 8,988,202.

(30) Foreign Application Priority Data

Apr. 14, 2010 (KR) .................... 10-2010-0034399

(51) Int. Cl.
*G06F 3/01* (2006.01)
*G06T 19/00* (2011.01)

(52) U.S. Cl.
CPC ............ *G06F 3/016* (2013.01); *G06T 19/006* (2013.01)

(58) Field of Classification Search
None
See application file for complete search history.

(56) References Cited

U.S. PATENT DOCUMENTS 6,191,796 B1 * 2/2001 Tarr ........................ G06F 3/014
 345/581
6,232,989 B1 * 5/2001 Walker .................... G06T 13/40
 345/161

(Continued)

FOREIGN PATENT DOCUMENTS

KR 10-2008-0072332 A 8/2008
KR 10-2010-0027976 A 3/2010
WO WO 2010105011 A1 * 9/2010 ............. G06F 3/016

OTHER PUBLICATIONS

Korean Office Action dated Mar. 2, 2016 in counterpart Korean Application No. 10-2010-0034399. (10 pages with English Translation).

*Primary Examiner* — Quan-Zhen Wang
*Assistant Examiner* — Chico A Foxx
(74) *Attorney, Agent, or Firm* — NSIP Law

(57) ABSTRACT

In an apparatus and method for processing a virtual world, haptic information regarding a virtual object in the virtual world, the haptic information corresponding to sensed information, is extracted and transmitted to a haptic feedback device. Accordingly, interaction between a real world and the virtual world is achieved. The processing speed of the haptic information with respect to the virtual object may be increased by varying data structures according to types of the virtual object.

15 Claims, 8 Drawing Sheets

(56) References Cited

U.S. PATENT DOCUMENTS

| | | | |
|---|---|---|---|
| 6,421,048 B1* | 7/2002 | Shih | G06F 3/016 345/419 |
| 6,545,682 B1* | 4/2003 | Ventrella | G06T 17/00 345/473 |
| 6,580,417 B2* | 6/2003 | Rosenberg | A63F 13/06 345/157 |
| 6,650,338 B1* | 11/2003 | Kolarov | G09B 23/285 345/619 |
| 7,148,789 B2* | 12/2006 | Sadler | G06F 1/1626 340/384.5 |
| 7,207,053 B1* | 4/2007 | Asmussen | G06Q 30/02 348/E7.063 |
| 7,275,987 B2* | 10/2007 | Shimakawa | A63F 13/12 463/1 |
| 7,676,356 B2* | 3/2010 | Carmel | G06T 19/00 703/21 |
| 7,982,711 B2* | 7/2011 | Anastas | G06F 3/016 318/568.17 |
| 8,154,524 B2* | 4/2012 | Wilson | G06F 17/5009 178/18.01 |
| 8,207,832 B2* | 6/2012 | Yun | G06F 3/016 340/407.1 |
| 8,294,557 B1* | 10/2012 | El Saddik | G06F 3/016 340/407.1 |
| 8,376,844 B2* | 2/2013 | Judd | A63F 13/02 463/30 |
| 8,386,918 B2* | 2/2013 | Do | G06F 3/011 715/230 |
| 8,482,532 B2* | 7/2013 | Seo | G06F 3/0488 345/156 |
| 8,723,820 B1 | 5/2014 | Han | |
| 8,812,358 B2* | 8/2014 | Tirpak | G06Q 30/0251 705/14.4 |
| 9,399,167 B2* | 7/2016 | Glaser | A63F 13/22 |
| 2002/0101400 A1* | 8/2002 | Stewart | G06F 3/016 345/156 |
| 2002/0109668 A1* | 8/2002 | Rosenberg | G05G 9/047 345/156 |
| 2002/0109708 A1* | 8/2002 | Peurach | G06F 3/016 715/700 |
| 2005/0124412 A1* | 6/2005 | Son | G06N 3/006 463/30 |
| 2006/0049920 A1* | 3/2006 | Sadler | G06F 1/1626 340/407.1 |
| 2006/0122819 A1* | 6/2006 | Carmel | G06T 19/00 703/21 |
| 2006/0284849 A1* | 12/2006 | Grant | G06F 3/016 345/173 |
| 2006/0288137 A1* | 12/2006 | Grant | G06F 3/016 710/62 |
| 2007/0091180 A1* | 4/2007 | Han | G06F 3/04842 348/207.99 |
| 2007/0174183 A1* | 7/2007 | Jung | G06Q 40/025 705/38 |
| 2007/0236449 A1* | 10/2007 | Lacroix | G06F 3/016 345/156 |
| 2007/0298877 A1 | 12/2007 | Rosenberg | |
| 2008/0172635 A1 | 7/2008 | Ross et al. | |
| 2008/0218514 A1* | 9/2008 | Tarr | G06T 15/00 345/424 |
| 2009/0079703 A1 | 3/2009 | Kyung et al. | |
| 2009/0088659 A1* | 4/2009 | Graham | G06F 3/016 600/545 |
| 2009/0135164 A1 | 5/2009 | Kyung et al. | |
| 2009/0195538 A1* | 8/2009 | Ryu | G06F 3/016 345/419 |
| 2009/0210797 A1* | 8/2009 | Cragun | G06F 3/04815 715/730 |
| 2009/0280896 A1* | 11/2009 | Judd | A63F 13/02 463/30 |
| 2009/0315839 A1* | 12/2009 | Wilson | G06F 17/5009 345/173 |
| 2009/0322498 A1 | 12/2009 | Yun et al. | |
| 2010/0013653 A1* | 1/2010 | Birnbaum | G06F 1/1613 340/669 |
| 2010/0030469 A1 | 2/2010 | Hwang et al. | |
| 2010/0039373 A1 | 2/2010 | Braun et al. | |
| 2010/0073304 A1 | 3/2010 | Grant et al. | |
| 2010/0134501 A1* | 6/2010 | Lowe | G06T 13/40 345/474 |
| 2010/0156818 A1* | 6/2010 | Burrough | G06F 3/016 345/173 |
| 2010/0161129 A1* | 6/2010 | Costa | A61B 19/2203 700/259 |
| 2010/0169801 A1 | 7/2010 | Blattner et al. | |
| 2010/0216552 A1* | 8/2010 | Rose | A63F 13/12 463/37 |
| 2010/0231540 A1* | 9/2010 | Cruz-Hernandez | G06F 3/0488 345/173 |
| 2010/0233667 A1* | 9/2010 | Wilson | G09B 7/00 434/362 |
| 2010/0261526 A1* | 10/2010 | Anderson | G06F 3/017 463/31 |
| 2010/0333037 A1 | 12/2010 | Pavlovski et al. | |
| 2011/0039605 A1 | 2/2011 | Choi et al. | |
| 2011/0102434 A1* | 5/2011 | Tarr | G06T 15/00 345/424 |
| 2011/0112441 A1 | 5/2011 | Burdea | |
| 2011/0148607 A1 | 6/2011 | Zeleny | |
| 2011/0148884 A1 | 6/2011 | Zeleny | |
| 2012/0010506 A1* | 1/2012 | Ullrich | A61B 1/00045 600/440 |
| 2012/0050325 A1* | 3/2012 | Joo | A63F 13/65 345/633 |
| 2012/0059787 A1* | 3/2012 | Brown | G06F 17/241 706/52 |
| 2012/0131435 A1 | 5/2012 | Douris et al. | |
| 2012/0233198 A1* | 9/2012 | Lanier | G06T 11/206 707/769 |
| 2013/0044073 A1* | 2/2013 | Christiansson | G06F 3/0421 345/173 |
| 2013/0222311 A1 | 8/2013 | Pesonen | |

* cited by examiner

METHOD AND APPARATUS FOR PROCESSING VIRTUAL WORLD

CROSS-REFERENCE TO RELATED APPLICATIONS

This application is a continuation application of U.S. patent application Ser. No. 13/082,698, filed on Apr. 8, 2011, which claims the benefit under 35 U.S.C. § 119(a) of Korean Patent Application No. 10-2010-0034399, filed on Apr. 14, 2010, in the Korean Intellectual Property Office, the entire disclosures of which are incorporated herein by reference for all purposes.

BACKGROUND

1. Field

Example embodiments of the following description relate to a method and apparatus for processing a virtual world, and more particularly, to a method and apparatus processing haptic information regarding a virtual object in a virtual world.

2. Description of the Related Art

Currently, interest in experience-type games has been increasing. Microsoft Corporation introduced PROJECT NATAL at the "E3 2009" Press Conference. PROJECT NATAL may provide a user body motion capturing function, a face recognition function, and a voice recognition function by combining Microsoft's XBOX 360 game console with a separate sensor device including a depth/color camera and a microphone array, thereby enabling a user to interact with a virtual world without a dedicated controller. Also, Sony Corporation introduced WAND which is an experience-type game motion controller. The WAND enables interaction with a virtual world through input of a motion trajectory of a controller by applying, to the Sony PLAYSTATION 3 game console, a location/direction sensing technology obtained by combining a color camera, a marker, and an ultrasonic sensor.

The interaction between a real world and a virtual world operates in one of two directions. In one direction, data information obtained by a sensor in the real world may be reflected to the virtual world. In the other direction, data information obtained from the virtual world may be reflected to the real world using an actuator.

Accordingly, there is a desire to implement an improved apparatus and method for processing haptic information regarding a virtual object.

SUMMARY

The foregoing and/or other aspects are achieved by providing an apparatus for processing a virtual world, including a receiver to receive sensed information from a sensor, an extractor to extract haptic property information from virtual object information regarding a virtual object corresponding to the sensed information, and a transmitter to transmit the haptic property information to a haptic feedback device.

The foregoing and/or other aspects are achieved by providing a method for processing a virtual world, including receiving sensed information from a sensor, extracting haptic property information from a virtual object information regarding a virtual object corresponding to the sensed information, and transmitting the haptic property information to a haptic feedback device.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
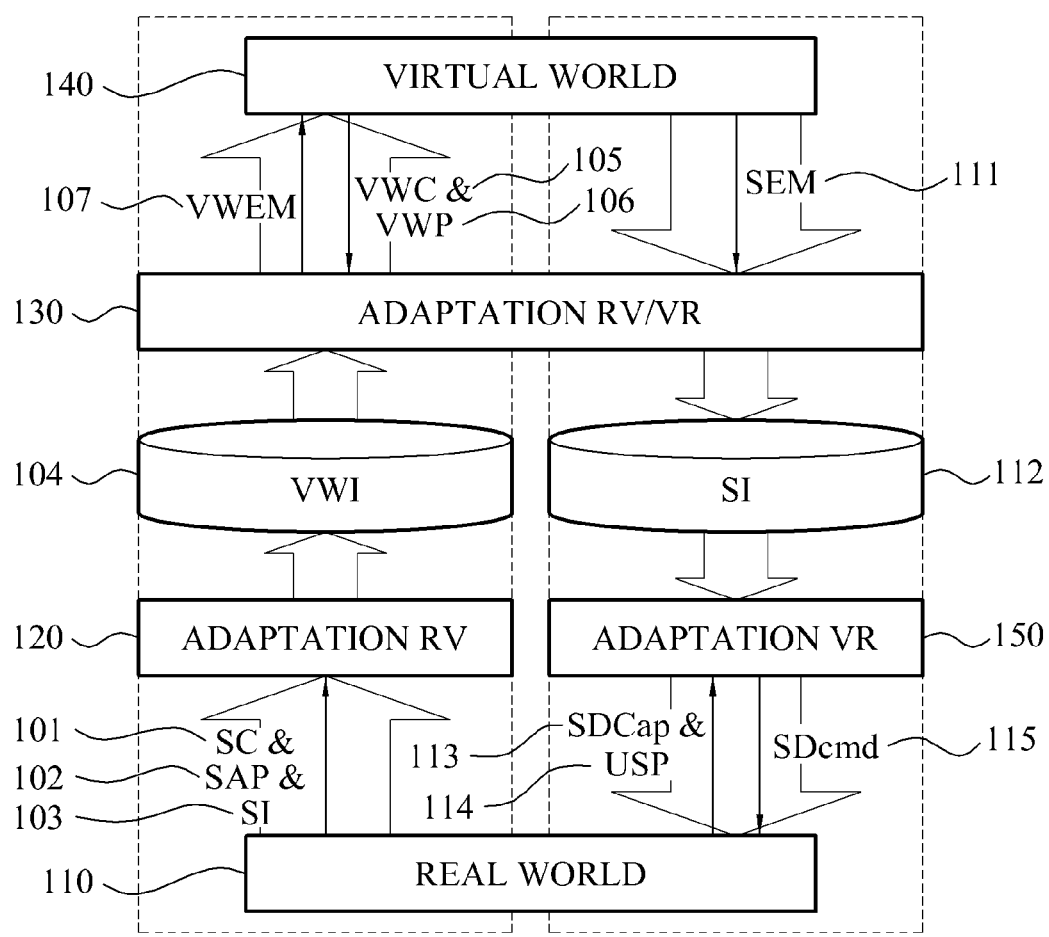
FIG. 1 illustrates a virtual world processing system that controls information exchange between a real world and a virtual world, according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a virtual world processing system that controls information exchange between a real world and a virtual world, according to example embodiments.

Referring to FIG. 1, the virtual world processing system may include a real world 110, a virtual world processing apparatus, and a virtual world 140.

The real world 110 may denote a sensor adapted to detect information in the real world 110, or a sensory device adapted to realize the information of the virtual world 140 in the real world 110.

The virtual world 140 may denote a virtual world realized by a program, or an immersive media reproducing apparatus adapted to reproduce contents including sensory effect information practicable in the real world 110.

The sensor according to the example embodiments may detect information on an action, state, intention, shape, and the like of a user of the real world 110, and transmit such information to the virtual world processing apparatus.

Depending on embodiments, the sensor may transmit data such as sensor capability 101, sensor adaptation preference 102, and sensed information 103.

The sensor capability 101 denotes information on the capability of the sensor. The sensor adaptation preference 102 denotes a degree of user preference with respect to the sensor capability. The sensed information 103 denotes information on the real world 110 detected by the sensor.

The virtual world processing apparatus according to the example embodiments may include an adaptation real world to virtual world (RV) 120, virtual world information (VWI) 104, and an adaptation Real World to Virtual World/Virtual World to Real World (RV/VR) 130.

The adaptation RV 120 may convert, into information applicable to the virtual world 140, the sensed information 103 detected by the sensor with respect to the real world 110 based on the sensor capability 101 and the sensor adaptation preference 102. Depending on embodiments, the adaptation RV 120 may be embodied by an RV engine.

The adaptation RV 120 according to example embodiments may convert the VWI 104 using the converted sensed information 130.

The VWI 104 may be information of the virtual object of the virtual world 140.

The adaptation RV/VR 130 may encode the converted VWI 104 and thereby generate virtual world effect metadata (VWEM) 107 which refers to metadata related to effects applied to the virtual world 104. Depending on embodiments, the adaptation RV/VR 130 may generate the VWEM 107 based on virtual world capabilities (VWC) 105 and virtual world preferences (VWP) 106.

The VWC 105 may be information related to capabilities of the virtual world 140. The VWP 106 may be information denoting a degree of user preference with respect to the capabilities of the virtual world 140.

The adaptation RV/VR 130 may transmit the VWEM 107 to the virtual world 140. Here, the VWEM 107 may be applied to the virtual world 140 so that effects corresponding to the sensed information 103 may be realized in the virtual world 140.

An effect event occurring in the virtual world 140 may be driven by the sensory device, that is, an actuator of the real world 110.

The virtual world 140 may generate sensory effect metadata (SEM) 111 by encoding sensory effect information which is information on the effect event generated in the virtual world 140. Depending on embodiments, the virtual world 140 may include an immersive media reproducing apparatus that reproduces contents including the sensory effect information.

The adaptation RV/VR 130 may generate sensory information 112 based on the SEM 111. The sensory information 112 may be information on the effect event being realized by the sensory device of the real world 110.

The adaptation VR 150 may generate information on a sensory device command (SDCmd) 115 to control operation of the sensory device. The adaptation VR 150 may generate information on the SDCmd 115 based on information on sensory device capabilities (SDCap) 113 and information on user sensory preference (USP) 114.

The SDCap 113 may be information on capabilities of the sensory device. The USP may be information denoting a degree of user preference with respect to effects being realized by the sensory device.

Figure 2:
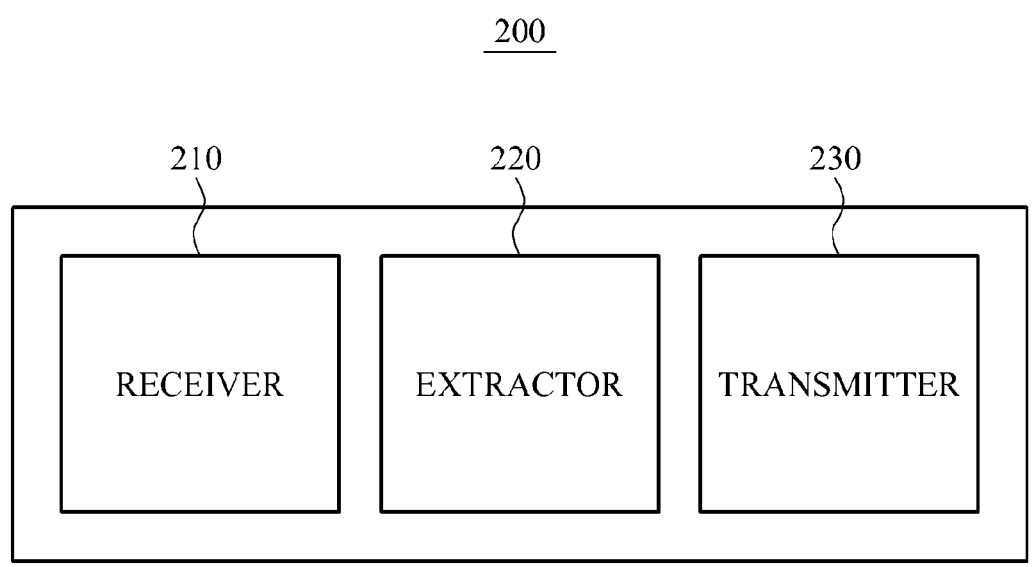
FIG. 2 illustrates a virtual world processing apparatus according to example embodiments.

FIG. 2 illustrates a virtual world processing apparatus 200 according to example embodiments.

Referring to FIG. 2, the virtual world processing apparatus 200 includes a receiver 210, an extractor 220, and a transmitter 230.

The receiver 210 may receive sensed information from a sensor.

The sensor is adapted to detect information regarding an object in a real world. The sensor may include a tactile display. The tactile display refers to a display capable of detecting a touch input applied to a screen.

Depending on embodiments, the sensor may encode the sensed information into extensible markup language (XML) type metadata, for example, and transmit the XML type metadata to the virtual world processing apparatus 200. In addition, the sensor may encode the sensed information into first metadata in the form of XML type metadata, and may further encode the first metadata into second metadata in the form of binary metadata to transmit the second metadata to the virtual world processing apparatus 200.

When a user touches a head of an avatar showing on the tactile display, the sensed information may include information on a position on the screen, to which the touch input is applied, and information on a touched portion of the avatar of the virtual world, that is, the head of the avatar.

The extractor 220 extracts haptic property information from virtual object information which is information regarding the virtual object.

The virtual object may include an avatar having a figure of a person or an animal, and other types of virtual object.

The virtual object information which refers to information on the virtual object may include the haptic property information.

The haptic property information refers to information on a haptic property given to the virtual object. For example, the haptic property information may include information on a material of the virtual object, roughness of the material, and the like. Also, the haptic property information may include the sensory effect information. The sensory effect information may be the information on the effect event realized by the actuator. For example, if the haptic property information is related to the roughness of the material, the sensory effect information may be information on intensity of a vibration, which corresponds to the roughness.

The avatar and other virtual objects may have different data structures.

The virtual object information regarding the virtual object except the avatar may include the haptic property information. In other words, a single virtual object may include single haptic property information. Therefore, when the virtual object is any virtual object other than the avatar, the extractor 220 may extract the haptic property information from the virtual object information regarding a virtual object corresponding to the sensed information, for example, a virtual object touched by the user through the tactile display.

When one virtual object includes a plurality of components, each of the plurality of components may include one haptic property. Here, the extractor 220 may extract the haptic property information regarding each component from the virtual object information.

For example, if a telephone in the virtual world includes a phone receiver and a main body as components, when the user touches the phone receiver by touching the tactile display, the extractor 220 may extract a haptic property of the phone receiver from the virtual object information regarding the telephone.

The virtual object information regarding the avatar may include an appearance element, for example, and a haptic property list.

The appearance element may include information on appearance of the avatar. The appearance element may also include the haptic reference ID.

The haptic property list refers to a list containing the haptic property information applied to the avatar. Depending on embodiments, the haptic reference ID may be allocated to the respective haptic property information.

When the virtual object is the avatar, the extractor 220 may extract the haptic reference ID from the appearance element of the avatar, the appearance element corresponding to the sensed information, and may extract the haptic property information corresponding to the haptic reference ID from the haptic property list.

In other words, the haptic reference ID, as opposed to the haptic property information, may be allocated to each appearance element of the avatar. Therefore, the extractor 220 may refer to the haptic property list using the haptic reference ID to extract the haptic information regarding the appearance element. That is, the extractor 220 may extract the haptic property information corresponding to the haptic reference ID, from the haptic property list.

The transmitter 230 may transmit the haptic property information extracted by the extractor 220 to the haptic feedback device.

The haptic feedback device is adapted to drive effects corresponding to the haptic property information in the real world. The haptic feedback device may include a Braille type display, a 4D theater vibration seat, a massage chair, and the like.

The transmitter 230 may encode the haptic property information into the XML-type metadata and transmit the metadata to the haptic feedback device. In addition, the transmitter 230 may encode the haptic property information into the binary metadata and transmit the binary metadata to the haptic feedback device. Also, the transmitter 230 may encode the haptic property information into the first metadata in the form of the XML type metadata, and further encode the first metadata into the second metadata in the form of the binary metadata to transmit the second metadata to the haptic feedback device.

Hereinafter, a data structure of a virtual object will be described in detail with reference to FIG. 3 through FIG. 7.

Figure 3:
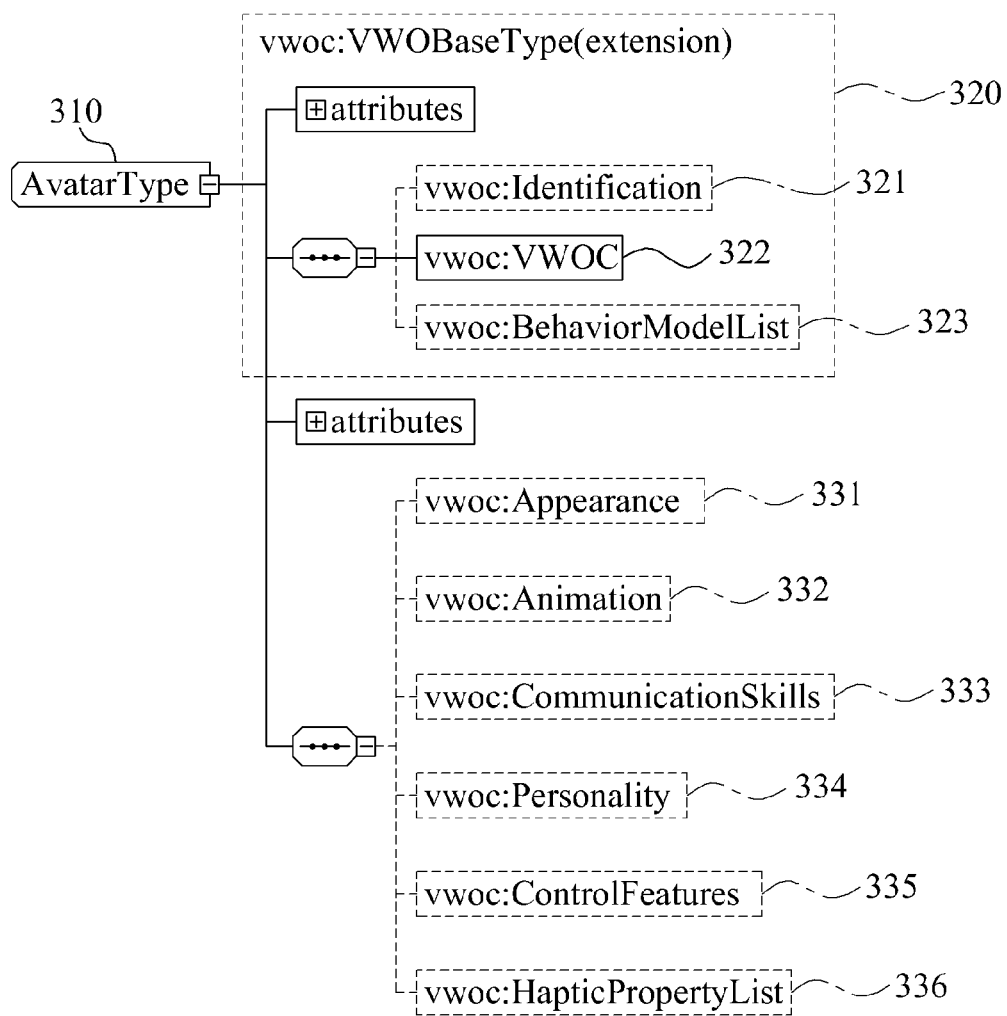
FIGS. 3 through 5 illustrate a data structure of an avatar according to example embodiments.
Figure 4:
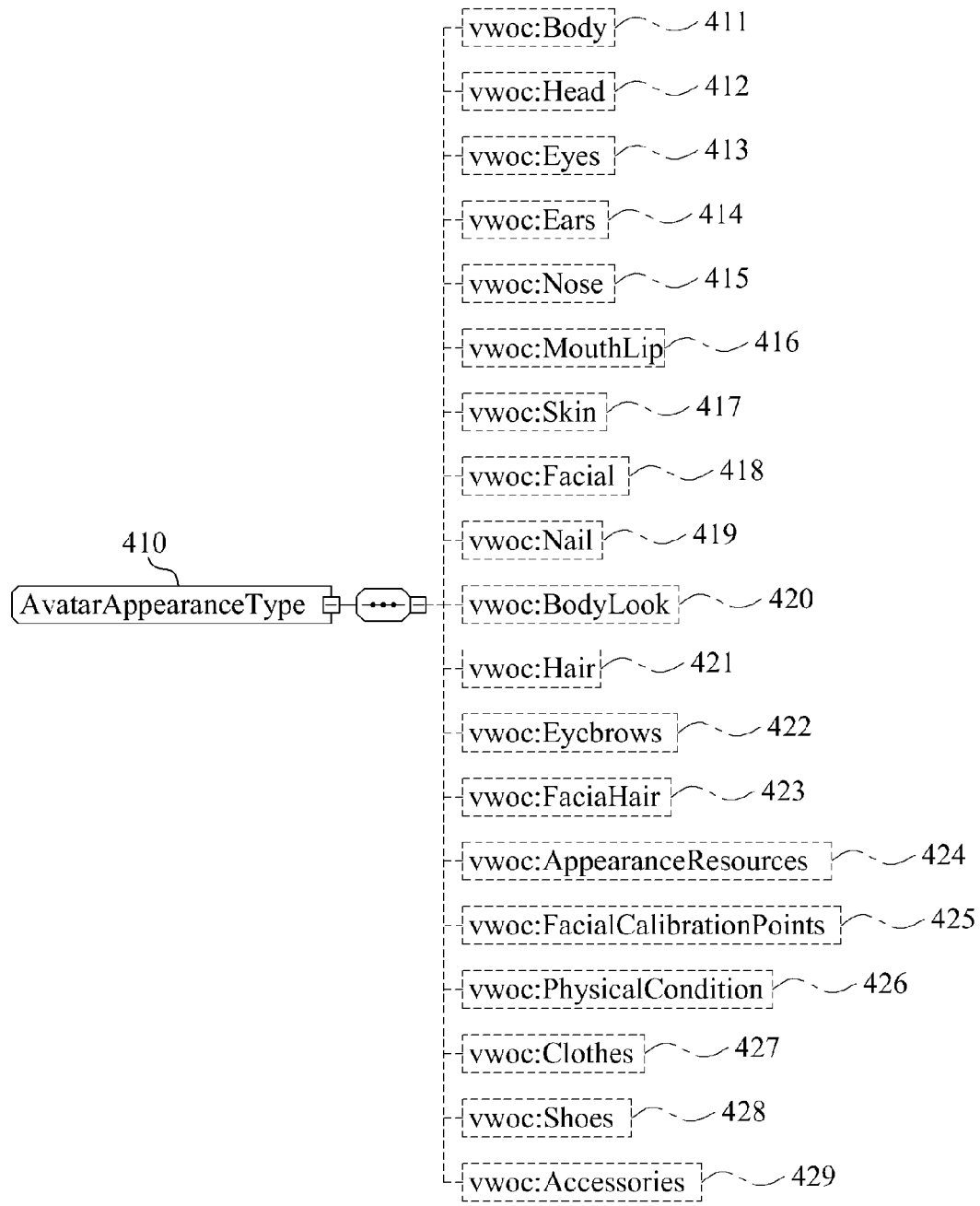
Figure 5:
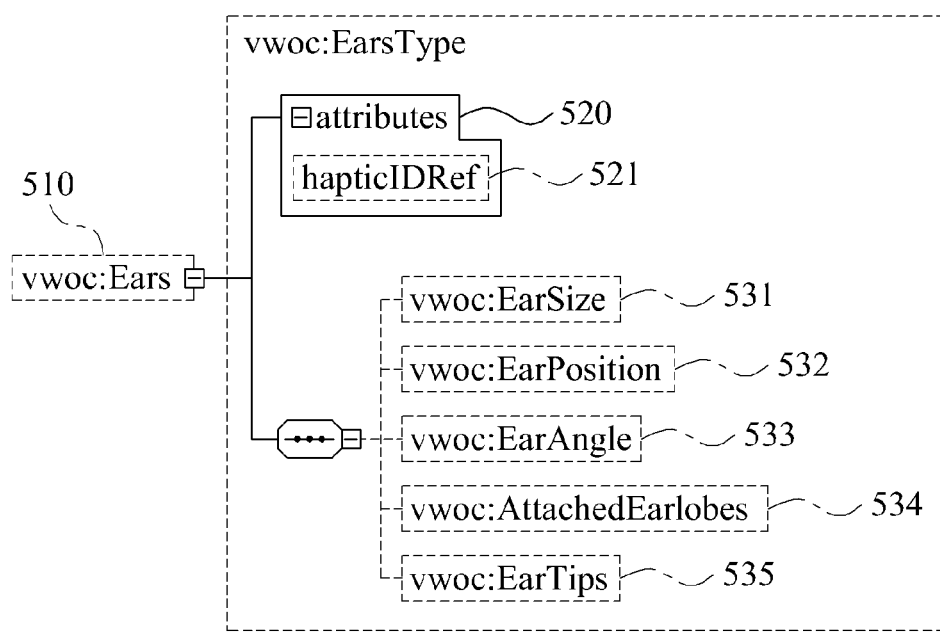

FIGS. 3 through 5 illustrate diagrams showing the data structure of an avatar as the virtual object, according to example embodiments.

AvatarType 310 in FIG. 3 denotes the data structure of the avatar in a virtual world.

The AvatarType 310 may include VWOBasetType 320, for example, and a plurality of elements.

The VWOBasetType 320 denotes information on a base type of the avatar of the virtual world. The VWOBasetType 320 may include identification 321, VWOC 322, and a behavior model list 323.

The plurality of elements of the AvatarType 310 may include Appearance 331, Animation 332, CommunicationSkills 333, Personality 334, ControlFeatures 335, and HapticPropertyList 336.

The Appearance 331 may include information on the appearance of the avatar. According to example embodiments, the Appearance 331 may include a haptic reference ID without haptic property information. A virtual world processing apparatus according to example embodiments may extract the haptic property information from a haptic property list using the haptic reference ID.

The HapticPropertyList 336 denotes a list including the haptic property information applied to the avatar.

Referring to FIG. 4, AvatarAppearanceType 410 includes Body 411, Head 412, Eyes 413, Ears 414, Nose 415, MouthLip 416, Skin 417, Facial 418, Nail 419, BodyLook 420, Hair 421, Eyebrows 422, Facial Hair 423, AppearanceResources 424, FacialCalibrationPoints 425, PhysicalCondition 426, Clothes 427, Shoes 428, and Accessories 429.

The avatar appearance type 410 denotes the data structure of the appearance element of the avatar.

Depending on embodiments, the appearance element regarding the Body 411, the Head 412, the Eyes 413, the Ears 414, the Nose 415, the MouthLip 416, the Skin 417, the Facial 418, the Nail 419, the BodyLook 420, the Hair 421, the Eyebrows 422, and the FacialHair 423 may include the haptic reference ID.

Table 1 shows XML code syntax regarding the avatar appearance type according to example embodiments.

TABLE 1

```
<!-- ############################################### -->
<!-- Avatar Appearance Type -->
<!-- ############################################### -->
<complexType name="AvatarAppearanceType">
    <sequence>
        <element name="Body" type="vwoc:BodyType" minOccurs="0"/>
        <element name="Head" type="vwoc:HeadType" minOccurs="0"/>
        <element name="Eyes" type="vwoc:EyesType" minOccurs="0"/>
        <element name="Ears" type="vwoc:EarsType" minOccurs="0"/>
        <element name="Nose" type="vwoc:NoseType" minOccurs="0"/>
        <element name="MouthLip" type="vwoc:MouthType" minOccurs="0"/>
        <element name="Skin" type="vwoc:SkinType" minOccurs="0"/>
        <element name="Facial" type="vwoc:FacialType" minOccurs="0"/>
        <element name="Nail" type="vwoc:NailType" minOccurs="0"/>
        <element name="BodyLook" type="vwoc:BodyLookType" minOccurs="0"/>
        <element name="Hair" type="vwoc:HairType" minOccurs="0"/>
        <element name="EyeBrows" type="vwoc:EyebrowsType" minOccurs="0"/>
        <element name="FacialHair" type="vwoc:FacialHairType" minOccurs="0"/>
        <element name="AppearanceResources" type="anyURI" minOccurs="0" maxOccurs="unbounded"/>
        <element name="FacialCalibrationPoints" type="vwoc:FacialCalibrationPointsType" minOccurs="0"/>
        <element name="PhysicalCondition" type="vwoc:PhysicalConditionType" minOccurs="0"/>
        <element name="Clothes" type="vwoc:VirtualObjectType" minOccurs="0" maxOccurs="unbounded"/>
        <element name="Shoes" type="vwoc:VirtualObjectType" minOccurs="0" maxOccurs="unbounded"/>
        <element name="Accessories" type="vwoc:VirtualObjectType" minOccurs="0" maxOccurs="unbounded"/>
    </sequence>
</complexType>
```

Table 2 shows XML code syntax with respect to the avatar appearance type regarding the Body 411 of the avatar, according to example embodiments.

TABLE 2

```
<complexType name="BodyType">
    <sequence>
        <element name="BodyHeight" type="float" minOccurs="0"/>
        <element name="BodyThickness" type="float" minOccurs="0"/>
        <element name="BodyFat" type="vwoc:measureUnitLMHType" minOccurs="0"/>
        <element name="TorsoMuscles" type="vwoc:measureUnitLMHType" minOccurs="0"/>
        <element name="NeckThikness" type="float" minOccurs="0"/>
        <element name="NeckLength" type="float" minOccurs="0"/>
        <element name="Shoulders" type="float" minOccurs="0"/>
        <element name="Pectorials" type="float" minOccurs="0"/>
        <element name="ArmLength" type="float" minOccurs="0"/>
        <element name="HeadSize" type="float" minOccurs="0"/>
        <element name="TorsoLength" type="float" minOccurs="0"/>
        <element name="LoveHandles" type="float" minOccurs="0"/>
        <element name="BellySize" type="float" minOccurs="0"/>
        <element name="LegMuscles" type="float" minOccurs="0"/>
        <element name="LegLength" type="float" minOccurs="0"/>
        <element name="HipWidth" type="float" minOccurs="0"/>
        <element name="HipLenght" type="float" minOccurs="0"/>
        <element name="ButtSize" type="float" minOccurs="0"/>
        <element name="Package" type="vwoc:indicateOfSMBType" minOccurs="0"/>
        <element name="SaddleBags" type="vwoc:indicateOfSMBType" minOccurs="0"/>
        <!--element name="KneeAngle" type="mpegvct:InclineAngleType" minOccurs="0"/-->
        <element name="KneeAngle" type="vwoc:angleType" minOccurs="0"/>
        <element name="FootSize" type="float" minOccurs="0"/>
    </sequence>
    <attribute name="hapticIDRef" type="IDREF" use="optional"/>
</complexType>
```

Table 3 shows XML code syntax with respect to the avatar appearance type regarding the Head 412 of the avatar, according to example embodiments.

TABLE 3

```
<!-- ############################################### -->
<!-- Head Type -->
<!-- ############################################### -->
<complexType name="HeadType">
    <sequence>
        <element name="HeadSize" type="vwoc:measureUnitSMBType" minOccurs="0"/>
        <element name="HeadStretch" type="vwoc:unlimitedPercentageType" minOccurs="0"/>
        <element name="HeadShape" minOccurs="0">
            <simpleType>
                <restriction base="string">
                    <enumeration value="square"/>
                    <enumeration value="round"/>
                    <enumeration value="oval"/>
                    <enumeration value="long"/>
                </restriction>
            </simpleType>
        </element>
        <element name="EggHead" type="boolean" minOccurs="0"/>
        <element name="HeadLength" type="float" minOccurs="0"/>
        <element name="FaceShear" type="float" minOccurs="0"/>
        <element name="ForeheadSize" type="float" minOccurs="0"/>
        <element name="ForeheadAngle" type="vwoc:angleType" minOccurs="0"/>
        <element name="BrowSize" type="float" minOccurs="0"/>
        <element name="FaceSkin" minOccurs="0">
            <simpleType>
                <restriction base="string">
                    <enumeration value="dry"/>
                    <enumeration value="normal"/>
                    <enumeration value="greassy"/>
```

TABLE 3-continued

```
            </restriction>
          </simpleType>
        </element>
        <element name="Cheeks"
type="vwoc:measureUnitSMBType" minOccurs="0"/>
        <element name="CheeksDepth" type="float" minOccurs="0"/>
        <element name="CheeksShape" minOccurs="0">
          <simpleType>
            <restriction base="string">
              <enumeration value="chubby"/>
              <enumeration value="high"/>
              <enumeration value="bone"/>
            </restriction>
          </simpleType>
        </element>
        <element name="UpperCheeks" type="vwoc:measureUnitSMBType"
minOccurs="0"/>
        <element name="LowerCheeks" type="vwoc:measureUnitSMBType"
minOccurs="0"/>
        <element name="CheekBones" type="vwoc:indicateOfDMUType"
minOccurs="0"/>
      </sequence>
      <attribute name="hapticIDRef" type="IDREF" use="optional"/>
</complexType>
```

Referring to Table 2 and Table 3, the XML code syntax with respect to the avatar appearance type regarding the Body 411 and the Head 412 includes '<attribute name="hapticIDRef" type="IDREF" use="optional"/>.' That is, the appearance element includes the haptic reference ID as opposed to the haptic property information. Accordingly, the virtual world processing apparatus may be able to extract the haptic property information with respect to the appearance element of the avatar, using the haptic reference ID.

Referring to FIG. 5, EarsType 510 among appearance elements of the avatar may include attributes 520 and a plurality of elements.

The attributes 520 denotes information on attributes of the appearance element regarding the EarsType 510.

The attributes 520 may include hapticIDRef 521. The hapticIDRef 521 may be ID information regarding the haptic property information included in the haptic property list.

For example, when a user touches ears of the avatar showing on a tactile display, a tactile display sensor may transmit sensed information to the virtual world processing apparatus.

Here, the sensed information may include position information regarding a touched position on a screen of the tactile display, and information that the virtual object corresponding to the position information is ears of the avatar.

The virtual world processing apparatus may extract the hapticIDRef 521 included in the appearance element regarding the ears, from the virtual object information regarding the avatar.

In addition, the virtual world processing apparatus may extract the haptic property information corresponding to the hapticIDRef 521, from the haptic property list included in the virtual object information regarding the avatar.

In addition, the virtual world processing apparatus may transmit the extracted haptic property information to the haptic feedback device.

The EarsType 510 may include EarSize 531, EarPosition 532, EarAngle 533, AttachedEarlobes 534, and EarTips 535.

Table 4 shows XML code syntax with respect to the avatar appearance type regarding the ears, according to example embodiments.

TABLE 4

```
<!-- ################################################# -->
<!-- Ears Type -->
<!-- ################################################# -->
<complexType name="EarsType">
    <sequence>
        <element name="EarSize" type="float" minOccurs="0"/>
        <element name="EarPosition"
type="vwoc:indicateOfDMUType" minOccurs="0"/>
        <element name="EarAngle" minOccurs="0">
            <simpleType>
                <restriction base="vwoc:angleType">
                    <maxInclusive value="180"/>
                </restriction>
            </simpleType>
        </element>
        <element name="AttachedEarlobes"
type="float" minOccurs="0"/>
        <element name="EarTips" type="vwoc:indicateOfPMNType"
minOccurs="0"/>
    </sequence>
    <attribute name="hapticIDRef" type="IDREF" use="optional"/>
</complexType>
```

Figure 6:
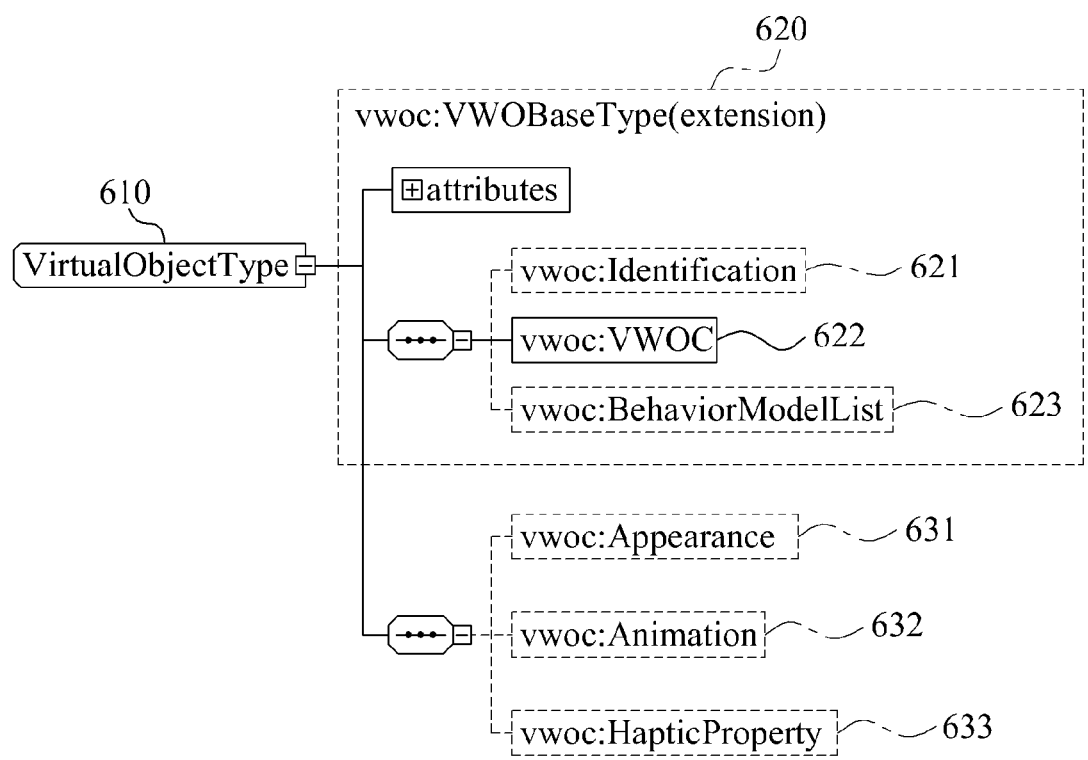
FIGS. 6 and 7 illustrate a data structure of a virtual object except for an avatar, according to example embodiments.
Figure 7:
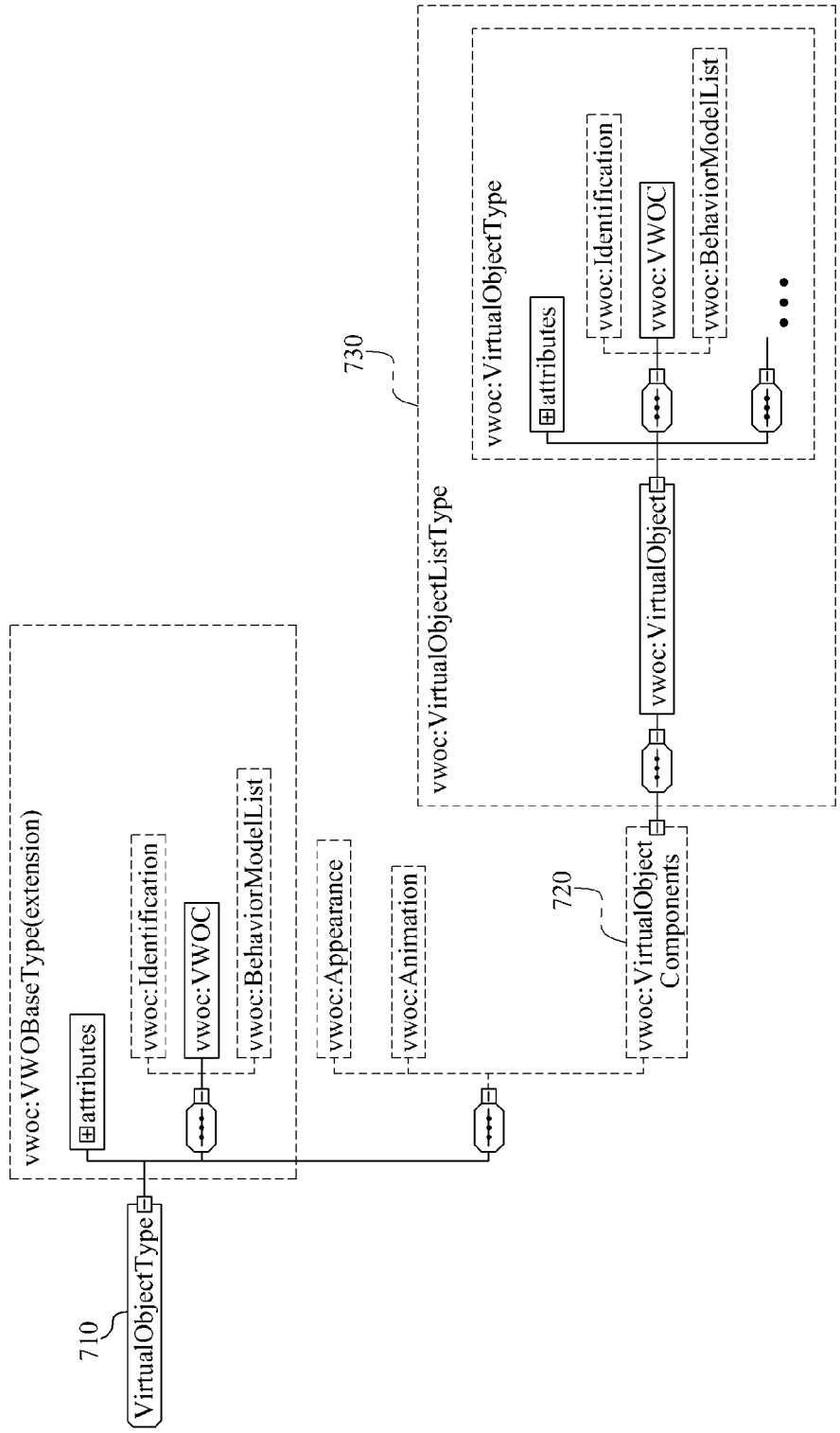

FIGS. 6 and 7 illustrate a data structure of a virtual object except for an avatar, according to example embodiments.

Referring to FIG. 6, VirtualObjectType 610 denotes a data structure of a virtual object except for an avatar.

The VirtualObjectType 610 may include a VWOBaseType 620 and a plurality of elements.

The VWOBaseType 620 denotes information on a base type of the virtual object in a virtual world. The VWOBaseType 620 may include identification 621, VWOC 622, and BehaviorModelList 623.

The plurality of elements of the VirtualObjectType 610 may include Appearance 631, Animation 632, and HapticProperty 633.

Different from the AvatarType 310 of FIG. 3, the VirtualObjectType 610 includes information on HapticProperty 633 of the virtual object, without a haptic property list. Therefore, the virtual world processing apparatus may extract haptic property information directly from virtual object information.

For example, when the user touches a virtual car showing on a tactile display, a tactile display sensor may transmit sensed information to the virtual world processing device.

Here, the sensed information may include position information regarding a touched position on a screen of the tactile display, and information that the virtual object corresponding to the position information is a virtual car.

The virtual world processing apparatus may extract information on the HapticProperty 633 from the virtual object information regarding the virtual car.

In addition, the virtual world processing apparatus may transmit the extracted information on the HapticProperty 633 to the haptic feedback device.

Table 5 shows XML code syntax with respect to the virtual object type, according to example embodiments.

TABLE 5

```
<!-- ################################################## -->
<!-- Virtual Object Type -->
<!-- ################################################## -->
<complexType name="VirtualObjectType">
    <complexContent>
        <extension base="vwoc:VWOBaseType">
            <sequence>
                <element name="Appearance" type="anyURI"
minOccurs="0" maxOccurs="unbounded"/>
                <element name="Animation"
type="vwoc:VOAnimationType" minOccurs="0"/>
                <element name="HapticProperty"
type="vwoc:VWOHapticPropertyType" minOccurs="0"/>
                <element name="VirtualObjectComponents"
type="vwoc:VirtualObjectListType" minOccurs="0"/>
            </sequence>
        </extension>
    </complexContent>
</complexType>
<complexType name="VirtualObjectListType">
    <sequence>
        <element name="VirtualObject"
type="vwoc:VirtualObjectType" maxOccurs="unbounded"/>
    </sequence>
</complexType>
```

According to example embodiments, the virtual object may include a plurality of components.

Referring to FIG. 7, VirtualObjectType 710 denotes a data structure of the virtual object in the case where the virtual object except for an avatar includes the plurality of components.

The VirtualObjectType 710 may include VirtualObjectComponents 720. When the virtual object includes the plurality of components, the VirtualObjectComponents 720 denote object information regarding each component of the virtual object.

The VirtualObjectComponents 720 may include VirtualObjectListType 730.

The VirtualObjectListType 730 may have the same data structure as the VirtualObjectType 610 of FIG. 6. Therefore, the VirtualObjectListType 730 may include only one haptic property. That is, each of the plurality of components of the virtual object may include only one haptic property.

For example, if the virtual car includes wheels and a car body as components, when the user touches the wheels shown on the tactile display, the tactile display sensor may transmit sensed information to the virtual world processing apparatus.

Here, the sensed information may include position information regarding a touched position on a screen of the tactile display, and information that the virtual object corresponding to the position information is the wheels of the virtual car.

The virtual world processing apparatus may extract haptic property information regarding the wheels of the virtual car from the virtual object information.

In addition, the virtual world processing apparatus may transmit the extracted haptic property information to the haptic feedback device.

Figure 8:
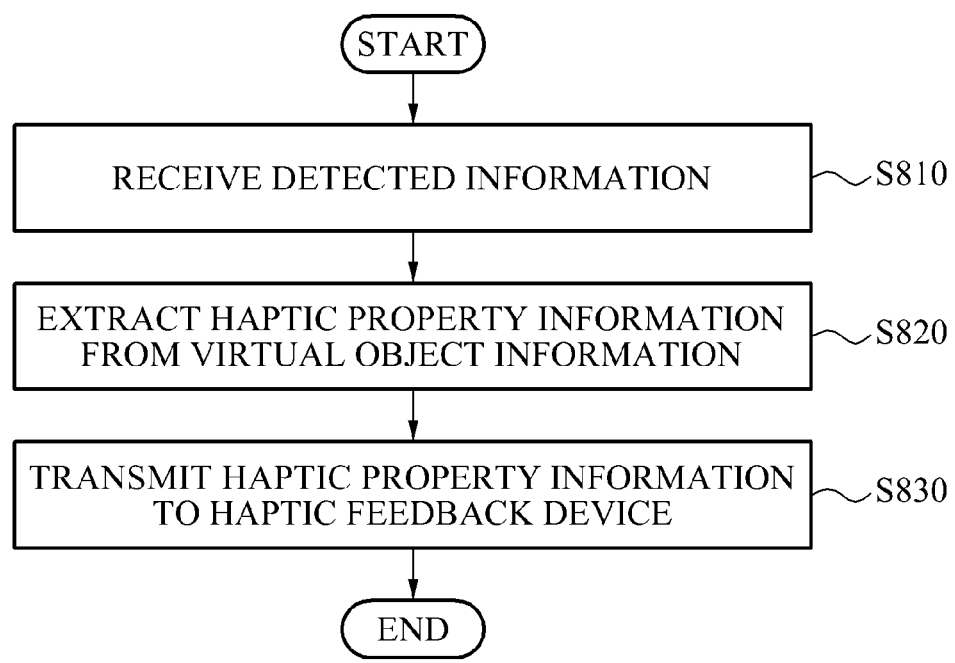
FIG. 8 illustrates a flowchart describing a virtual world processing method, according to example embodiments.

FIG. 8 illustrates a flowchart describing a virtual world processing method, according to example embodiments.

Referring to FIG. 8, the virtual world processing method receives sensed information from a sensor in operation S810.

The sensor is adapted to detect information on an object in a real world. The sensor may include a tactile display. The tactile display denotes a display capable of detecting a touch input applied to a screen.

Depending on embodiments, the sensor may encode the sensed information into an XML type metadata and transmit the XML type metadata. In addition, the sensor may encode the sensed information into first metadata in the form of XML type metadata, and may further encode the first metadata into second metadata in the form of binary metadata to transmit the second metadata.

When a user touches a head of an avatar showing on the tactile display, the sensed information may include information on a position on the screen, to which the touch input is applied, and information on a touched portion of the avatar of the virtual world, that is, the head of the avatar.

In operation S820, The virtual world processing method extracts haptic property information from virtual object information regarding the virtual object, which corresponds to the sensed information.

The virtual object may be classified into an avatar having a figure of a person or an animal, and other types of virtual object.

The virtual object information which refers to information on the virtual object may include the haptic property information.

The haptic property information refers to information on a haptic property given to the virtual object. For example, the haptic property information may include information on a material of the virtual object, roughness of the material, and the like. Also, the haptic property information may include sensory effect information. The sensory effect information may be information on the effect event realized by an actuator. For example, if the haptic property information is related to the roughness of the material, the sensory effect information may be information on intensity of vibration, which corresponds to the roughness.

The avatar and other virtual objects may have different data structures.

The virtual object information regarding the virtual object except the avatar may include the haptic property information. In other words, a single virtual object may include single haptic property information. Therefore, when the virtual object is any virtual object other than the avatar, the virtual world processing method may extract the haptic property information from the virtual object information regarding a virtual object corresponding to the sensed information, for example, a virtual object touched by the user through the tactile display.

When one virtual object includes a plurality of components, each of the plurality of components may include one haptic property. Here, the virtual world processing method may extract the haptic property information regarding each component, from the virtual object information.

For example, if a telephone of the virtual world includes a phone receiver and a main body as components, when the user touches the phone receiver by touching the tactile display, the virtual world processing method may extract a haptic property of the phone receiver from the virtual object information regarding the telephone.

The virtual object information regarding the avatar may include an appearance element and a haptic property list.

The appearance element may include information on appearance of the avatar. The appearance element may also include the haptic reference ID.

The haptic property list refers to a list containing the haptic property information applied to the avatar. Depending on embodiments, the haptic reference ID may be allocated to the respective haptic property information.

When the virtual object is the avatar, the virtual world processing method may extract the haptic reference ID from the appearance element of the avatar, the appearance element corresponding to the sensed information, and may extract the haptic property information corresponding to the haptic reference ID from the haptic property list.

In other words, the haptic reference ID, as opposed to the haptic property information, may be allocated to each appearance element of the avatar. Therefore, virtual world processing method may refer to the haptic property list using the haptic reference ID to extract the haptic information regarding the appearance element. That is, the virtual world processing method may extract the haptic property information corresponding to the haptic reference ID, from the haptic property list.

The virtual world processing method transmits the extracted haptic property information to the haptic feedback device in operation 830.

The haptic feedback device is adapted to drive effects corresponding to the haptic property information in the real world. The haptic feedback device may include a Braille type display, a 4D theater vibration seat, a massage chair, and the like.

According to example embodiments, the virtual world processing method may encode the haptic property information into the XML-type metadata and transmit the metadata to the haptic feedback device. In addition, the virtual world processing method may encode the haptic property information into the binary metadata and transmit the binary metadata to the haptic feedback device. Also, the virtual world processing method may encode the haptic property information into the first metadata in the form of the XML type metadata, and further encode the first metadata into the second metadata in the form of the binary metadata to transmit the second metadata to the haptic feedback device.

The apparatus and method according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An apparatus comprising:
an extractor configured to extract virtual object information, via the use of a sensor, based on a data structure of an avatar, in a virtual world, for processing the virtual world,
wherein the virtual object information comprises an appearance element of the avatar that denotes the data structure and a list element, wherein the appearance element comprises at least one sub-element regarding an appearance type according to a body type of the avatar or a clothing item worn by the avatar and the list element comprises a plurality of haptic properties, and wherein the at least one sub-element comprises identification information without the plurality of haptic properties and the identification information refers to at least one of the plurality of haptic properties in the list element,
wherein the extractor is further configured to:
extract the identification information from a sub-element from among the at least one sub-element of the appearance element; and
extract a haptic property corresponding to the at least one sub-element from among the plurality of haptic properties of the list element using the extracted identification information, in response to the virtual object information comprising the sub-element,
wherein the haptic property corresponds to the extracted identification information, and the extracted haptic property is used to provide haptic feedback corresponding to the appearance type, and
wherein the apparatus is configured to:
identify the sub-element from among the at least one sub-element by using the identification information to provide the haptic feedback; and
provide the haptic property which corresponds to the identified sub-element by using the identification information which refers to the haptic property to enable a user of the apparatus to experience a sensation corresponding to a perceived physical interaction with the avatar, corresponding to sensed information received by the sensor.

2. The apparatus of claim 1, further comprising a receiver configured to receive sensed information from the sensor.

3. The apparatus of claim 2, wherein the extractor is further configured to extract the identification information from the sub-element, among the at least one sub-element of the appearance element, which corresponds to the sensed information received from the sensor.

4. The apparatus of claim 2, wherein the extractor is further configured to
extract a portion of the avatar based on the sensed information received from the sensor, extract a sub-element corresponding to the extracted portion, and extract the identification information from the sub-element corresponding to the extracted portion.

5. The apparatus of claim 2, wherein the sensed information comprises position information regarding a touched position on the sensor and information on a touched portion of the avatar.

6. The apparatus of claim 1, further comprising a transmitter configured to transmit control information to a haptic feedback device, based on the extracted haptic property.

7. A method comprising:
extracting virtual object information, via the use of a sensor, based on a data structure of an avatar, in a virtual world, for processing the virtual world,
wherein the virtual object information comprises an appearance element of the avatar that denotes the data structure and a list element, wherein the appearance element comprises at least one sub-element regarding an appearance type according to a body type of the avatar or a clothing item worn by the avatar and the list element comprises a plurality of haptic properties, and wherein the at least one sub-element comprises identification information without the plurality of haptic properties and the identification information refers to at least one of the plurality of haptic properties in the list element,
wherein the extracting comprises:
extracting the identification information from a sub-element among the at least one sub-element of the appearance element; and
extracting a haptic property corresponding to the at least one sub-element from among the plurality of haptic properties of the list element using the extracted identification information, in response to the virtual object information comprising the sub-element, and
wherein the haptic property corresponds to the extracted identification information, and the extracted haptic property is used to provide haptic feedback corresponding to the appearance type;
identifying the sub-element from among the at least one sub-element by using the identification information to provide the haptic feedback; and
providing the haptic property which corresponds to the identified sub-element by using the identification information which refers to the haptic property to enable a user to experience a sensation corresponding to a perceived physical interaction with the avatar, corresponding to sensed information received by the sensor.

8. The method of claim 7, further comprising receiving sensed information from the sensor.

9. The method of claim 8, wherein the extracting of the identification information comprises extracting the identification information from the sub-element, among the at least one sub-element of the appearance element, corresponding to the sensed information received from the sensor.

10. The method of claim 8, wherein the extracting of the identification information comprises
extracting a portion of the avatar based on the sensed information received from the sensor,
extracting a sub-element corresponding to the extracted portion, and
extracting the identification information from the sub-element corresponding to the extracted portion.

11. The method of claim 8, wherein the sensed information comprises position information regarding a touched position on the sensor and information on a touched portion of the avatar.

12. The method of claim 7, further comprising transmitting control information to a haptic feedback device based on the extracted haptic property.

13. A non-transitory computer-readable medium storing instructions that, when executed by a processor, cause the processor to perform the method of claim 7.

14. An apparatus, comprising:
a receiver configured to receive sensed information from a sensor; and
an extractor configured to extract virtual object information, via the use of the sensor, based on a data structure of a virtual object, in a virtual world, for processing the virtual world,
wherein when the virtual object is an avatar, the virtual object information comprises an appearance element of the avatar that denotes the data structure and a list element, wherein the appearance element comprises at least one sub-element regarding an appearance type according to a body type of the avatar or a clothing item worn by the avatar and the list element comprises a plurality of haptic properties, and wherein the at least one sub-element comprises identification information without the plurality of haptic properties and the identification information refers to at least one of the plurality of haptic properties in the list element,
wherein the extractor is further configured to, in response to the virtual object being an avatar,
extract the identification information from a sub-element among the at least one sub-element of the appearance element, and
extract a haptic property corresponding to the at least one sub-element from among the plurality of haptic properties of the list element using the extracted identification information, in response to the virtual object information comprising the sub-element,
wherein the extractor is further configured to, in response to a user touching the virtual object and the virtual object not being an avatar, extract haptic property information regarding a virtual object corresponding to the sensed information from the virtual object information, and
wherein the haptic property corresponds to the extracted identification information, and the extracted haptic property is used to provide haptic feedback to enable the user of the apparatus to experience a sensation corresponding to a perceived physical interaction with the avatar, corresponding to sensed information received by the sensor.

15. The apparatus of claim 14, wherein
the avatar comprises the appearance element and additional appearance elements,
the identification information is allocated to each of the appearance element and the additional appearance elements, and
the extractor is further configured to extract the haptic property information corresponding to the identification information, from the list element.

* * * * *